United States Patent
Bennetzen et al.

(10) Patent No.: US 10,138,410 B2
(45) Date of Patent: *Nov. 27, 2018

(54) METHOD AND SYSTEM FOR THE ENHANCED RECOVERY OF OIL, USING WATER THAT HAS BEEN DEPLETED IN IONS USING MAGNETIC PARTICLES

(71) Applicant: Total E&P Danmark A/S, Copenhagen (DK)

(72) Inventors: Martin Vad Bennetzen, Copenhagen (DK); Kristian Mogensen, Copenhagen (DK)

(73) Assignee: TOTAL E&P DANMARK A/S (DK)

( * ) Notice: Subject to any disclaimer, the term of this patent is extended or adjusted under 35 U.S.C. 154(b) by 0 days.

This patent is subject to a terminal disclaimer.

(21) Appl. No.: 15/033,495

(22) PCT Filed: Sep. 30, 2014

(86) PCT No.: PCT/EP2014/070891
§ 371 (c)(1),
(2) Date: Apr. 29, 2016

(87) PCT Pub. No.: WO2015/044445
PCT Pub. Date: Apr. 2, 2015

(65) Prior Publication Data
US 2016/0264846 A1 Sep. 15, 2016

(30) Foreign Application Priority Data
Sep. 30, 2013 (DK) .................................. 201370543

(51) Int. Cl.
*C09K 8/58* (2006.01)
*E21B 43/20* (2006.01)
*E21B 43/26* (2006.01)

(52) U.S. Cl.
CPC ................ *C09K 8/58* (2013.01); *E21B 43/20* (2013.01); *E21B 43/26* (2013.01); *C09K 2208/10* (2013.01)

(58) Field of Classification Search
USPC ........................................................ 210/695
See application file for complete search history.

(56) References Cited

U.S. PATENT DOCUMENTS

| 3,300,375 A | 1/1967 | Clifford |
| 3,970,518 A | 7/1976 | Giaever |

(Continued)

FOREIGN PATENT DOCUMENTS

| AU | 2012101651 A4 | 12/2012 |
| CN | 1736881 A | 2/2006 |

(Continued)

OTHER PUBLICATIONS

Urban et al., "Functionalized paramagnetic nanoparticles for waste water treatment", published May 25, 2010.

(Continued)

*Primary Examiner* — Angela M DiTrani
(74) *Attorney, Agent, or Firm* — Brinks Gilson & Lione

(57) ABSTRACT

A method of depleting an ion from a water source is provided. The method is applicable to water used in oil recovery, water used in natural gas recovery, the treatment of water wells, and for water used in hydraulic fluids for fracturing processes, such as water to be used in proppants or fracking fluids. The method involves depleting an ion from a water source, said method comprising contacting a water source with a superparamagnetic or paramagnetic nanoparticle; complexing the ion with the particle; and removing the ion-particle complex by applying a magnetic field so as to provide a water source with depleted ion content. The depleted water can then be pumped into one or (Continued)

more connecting injection well(s) in an oil field pushing the crude oil towards one or more production well(s) thereby allowing for enhanced oil recovery from the production wells.

25 Claims, 2 Drawing Sheets

(56) References Cited

U.S. PATENT DOCUMENTS

| | | | |
|---|---|---|---|
| 4,246,355 A | 1/1981 | Bolto et al. | |
| 4,247,398 A | 1/1981 | Mohri | |
| 4,279,756 A | 7/1981 | Weiss et al. | |
| 4,285,819 A | 8/1981 | Yen et al. | |
| 4,452,773 A | 6/1984 | Molday | |
| 4,476,027 A | 10/1984 | Fox | |
| 4,846,962 A | 7/1989 | Yao | |
| 5,230,805 A | 7/1993 | Yates et al. | |
| 5,397,476 A | 3/1995 | Bradbury et al. | |
| 5,405,531 A | 4/1995 | Hitzman et al. | |
| 5,753,180 A | 5/1998 | Burger | |
| 5,855,790 A | 1/1999 | Bradbury et al. | |
| 6,596,182 B1 | 7/2003 | Prenger et al. | |
| 6,669,849 B1 | 12/2003 | Nguyen et al. | |
| 7,169,618 B2 | 1/2007 | Skold | |
| 8,021,540 B2 | 9/2011 | Toida | |
| 8,636,906 B2 * | 1/2014 | Stein | B03C 1/01 |
| | | | 210/683 |
| 2003/0102255 A1 | 6/2003 | Mahajan | |
| 2004/0241428 A1 | 12/2004 | Kohno | |
| 2006/0037914 A1 | 2/2006 | Niki et al. | |
| 2007/0246426 A1 * | 10/2007 | Collins | C09K 8/528 |
| | | | 210/651 |
| 2009/0017518 A1 | 1/2009 | Wu et al. | |
| 2009/0050315 A1 | 2/2009 | Fallon et al. | |
| 2009/0120842 A1 | 5/2009 | Koseoglu et al. | |
| 2010/0051510 A1 | 3/2010 | Lee | |
| 2010/0051557 A1 * | 3/2010 | Etemad | C02F 1/281 |
| | | | 210/688 |
| 2010/0059449 A1 * | 3/2010 | Grass | B03C 1/015 |
| | | | 210/695 |
| 2010/0147647 A1 | 6/2010 | Koseoglu et al. | |
| 2011/0030967 A1 * | 2/2011 | McGuire | C02F 1/42 |
| | | | 166/369 |
| 2011/0139687 A1 | 6/2011 | Yeganeh et al. | |
| 2011/0306525 A1 | 12/2011 | Lighthelm | |
| 2012/0018382 A1 | 1/2012 | Stein | |
| 2012/0103913 A1 * | 5/2012 | Kiyoto | B03C 1/01 |
| | | | 210/695 |
| 2012/0145601 A1 | 6/2012 | Lee | |
| 2012/0145637 A1 | 6/2012 | Alfadul et al. | |
| 2013/0023448 A1 | 1/2013 | Glasscott et al. | |
| 2013/0134098 A1 | 5/2013 | Kostedt et al. | |
| 2013/0168097 A1 * | 7/2013 | Janssen | E21B 43/20 |
| | | | 166/305.1 |
| 2013/0216833 A1 | 8/2013 | Logli et al. | |
| 2014/0131288 A1 * | 5/2014 | Gu | B01J 37/0221 |
| | | | 210/748.14 |
| 2015/0217288 A1 * | 8/2015 | Hutter | B01J 49/57 |
| | | | 435/188 |

FOREIGN PATENT DOCUMENTS

| | | |
|---|---|---|
| CN | 102531116 | 7/2012 |
| CN | 102675537 A | 9/2012 |
| CN | 103084147 A | 5/2013 |
| DE | 4307262 A1 | 9/1994 |
| DE | 10160664 A1 | 6/2003 |
| DE | 102009035764 A1 | 2/2011 |
| EP | 0083202 A1 | 7/1983 |
| EP | 2244268 A1 | 10/2010 |
| EP | 2339343 A1 | 6/2011 |
| EP | 2349919 A2 | 8/2011 |
| GB | 2019378 A | 10/1979 |
| GB | 1583881 A | 2/1981 |
| WO | 9707064 A1 | 2/1997 |
| WO | 2008055371 A2 | 5/2008 |
| WO | 2009123683 A2 | 10/2009 |
| WO | 2010062586 A2 | 6/2010 |

OTHER PUBLICATIONS

International Type Search Report for Danish Application No. PA 2013 70543, Completed Feb. 3 2014.
Office Action for Danish Application No. PA 2013 70543, Completed May 15, 2014.
International Preliminary Report on Patentability for PCT/EP2014/070891, dated Apr. 5, 2016.
International Search Report Jan. 5, 2015 and Written Opinion for PCT/EP2014/070891, dated Jan. 5, 2015.
Bruce et al., "Synthesis, characterisation and application of silica-magnetite nanocomposites", Available online Aug. 2, 2004.
Arthur et al., Technical Summary of Oil Produced Water Treatment Technologies, Mar. 2005, pp. 1-60 (Year/ 2005).
Igunna et al., Produced Water Treatment Technologies, Apr. 30, 2012 (Year/ 2012).
Dejak, The Next Generation Water Filter for the Oil and Gas Industry, Young Technology Showcase, Oct. 2013 (Year/ 2013).
Old Oil Field Waterplood Operations and Enhanced Oil Recovery Potential, vol. 2, Chapter 12, p. 1-56, no date (Year/ 0).

* cited by examiner

A. Starting point:
Particles and ions in separate water tanks

B. Particles and ions are mixed – ions are sequestered!

C. Magnet attracts magnetic particles and sequestered Ions are removed from the water phase

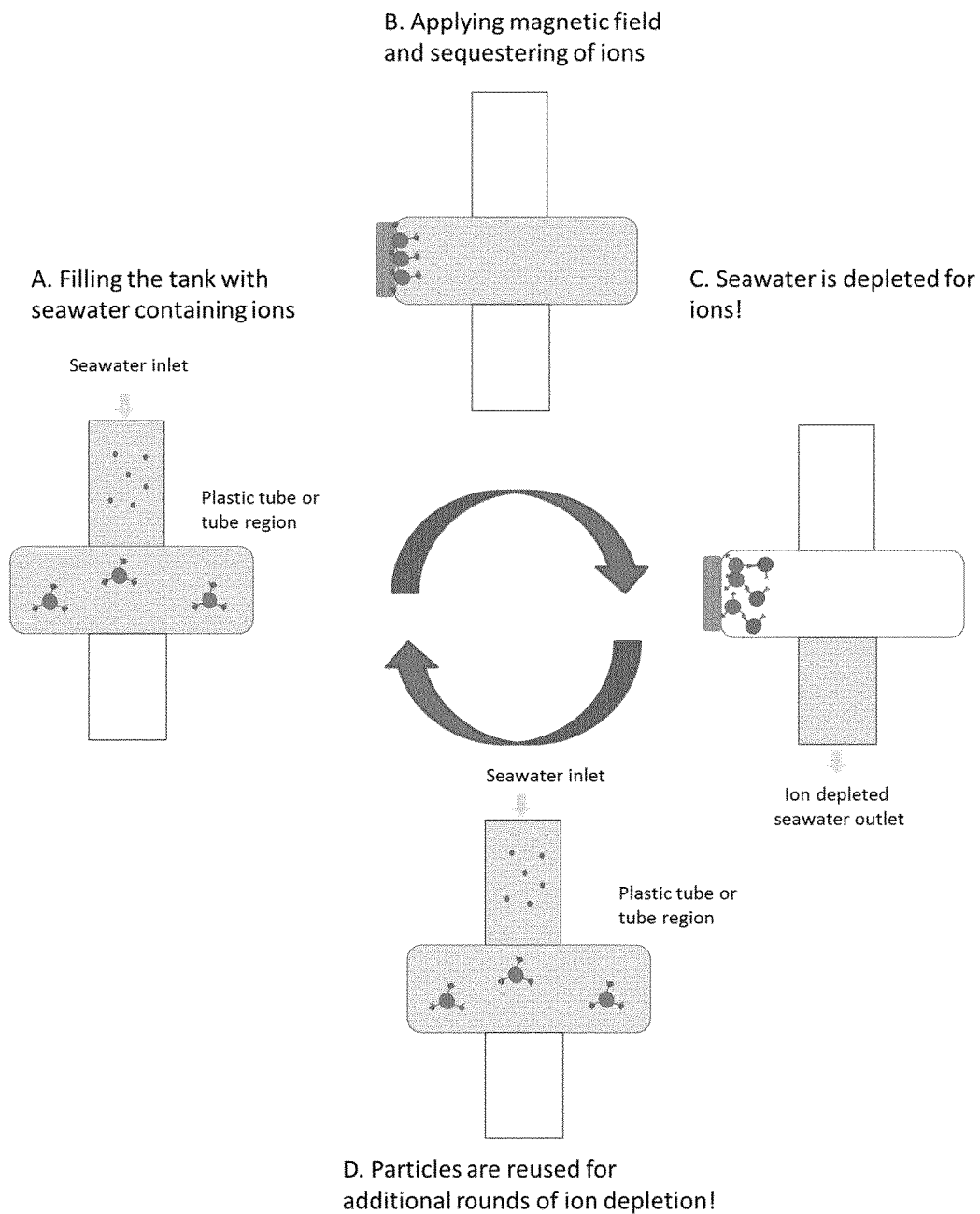

METHOD AND SYSTEM FOR THE ENHANCED RECOVERY OF OIL, USING WATER THAT HAS BEEN DEPLETED IN IONS USING MAGNETIC PARTICLES

RELATED APPLICATIONS

This application claims the benefit under 35 U.S.C. § 371 of the filing date of International Patent Application No. PCT/EP2014/070891, having an international filing date of Sep. 30, 2014, which claims priority to Danish Application No. PA 2013 70543, filed Sep. 30, 2013, the contents of PCT/EP2014/070891 are incorporated herein by reference in their entirety.

FIELD OF INVENTION

The method of the invention is directed to using paramagnetic nanoparticles for the depletion of ions from large volumes of water suitable for water flooding used in oil recovery, in natural gas recovery and for water used in fracking fluids. Hydraulic fracturing, or "fracking", is the process of drilling and injecting fluid into the ground at a high pressure in order to fracture shale rocks to release natural gas inside.

BACKGROUND OF THE INVENTION

Water flooding as an oil recovery technique has been in use since 1890 when operators in the US realised that water entering the productive reservoir formation was stimulating production. In some cases, water is supplied from an adjacently connected aquifer to push the oil towards the producing wells. In situations where there is no aquifer support, water must be pumped into the reservoir through dedicated injection wells. The water phase replaces the oil and gas in the reservoir and thereby serves to maintain pressure. Recovery factors from water flooding vary from 1-2% in heavy oil reservoirs up to 50% with typically values around 30-35%, compared to 5-10% obtained from primary depletion without water flooding.

Wettability refers to the tendency of a fluid to preferentially cover the surface of a solid, in this case the reservoir rock, and is often estimated by measuring the contact angle. If a water droplet has a contact angle below 90°, the rock is said to be water-wet. On the other hand, if oil preferentially wets the rock surface, the rock is referred to as oil-wet. Many rocks, however, contain some surfaces that are water-wet and others that are oil-wet; such rocks are called mixed-wet. When a fluid such as water wets the rock surface, it forms a film layer, which maintains hydraulic connectivity throughout the rock. In a mixed-wet system, both oil and water can maintain hydraulic continuity at the same time over a large saturation span. Wettability is thought to be one of the most important factors governing oil recovery. Experimental evidence suggests that oil recovery increases as the contact angle approaches 90°, a situation called neutral wettability, where neither of the fluids tends to wet the rock.

Current methods for altering reservoir rock wettability from strongly oil-wet or strongly water-wet towards neutral-wet have so far all been water-based, involving surfactants or modifying the ion content of the injection water Currently, ions, salts, elements, minerals and other analytes can be removed from injection water by various processes, such as reverse osmosis, filtration, including nano-filtration, vapour distillation and freezing desalination. There is a need to deplete water of its ion content for various ends in the oil industry.

SUMMARY OF THE INVENTION

The invention is generally directed to a method of depleting the content of a selected ion or a combination of ions from a water source, such as for a water flooding process. The invention relates to a method of treating an oil well, more specifically to a method for recovering crude oil from a subsurface reservoir by water flooding, said methods using water depleted in ion content.

A first aspect of the invention is directed to a method for recovering crude oil from a hydrocarbon-bearing reservoir by water flooding, the method comprises the steps of:
(i) Providing a water source;
(ii) Capturing one or more ions from the water source by contacting the water source with a superparamagnetic or paramagnetic particle capable of binding the one or more ions present in the water source providing a capturing mixture;
(iii) Removing the ions bound to the superparamagnetic or paramagnetic particles from the capturing mixture by applying a magnetic field providing a depleted water;
(iv) Pumping the depleted water into one or more connecting injection well(s) in an oil field pushing the crude oil towards one or more production well(s);
(v) Recovering the crude oil from the one or more production well(s).

According to an embodiment of the first aspect, the superparamagnetic or paramagnetic particles are coated with an inorganic compound.

According to an embodiment of the first aspect, the superparamagnetic or paramagnetic particles are at least partially coated with silica including derivatized silica.

According to an embodiment of the first aspect, the superparamagnetic or paramagnetic particles are functionalized with a moiety capable of specifically binding the one or more ions present in the water source.

According to an embodiment of the first aspect, the functionalization adapted to complex the particle to ions consists of a linked ion sequester or chelating agent.

According to an embodiment of the first aspect, the functionalization adapted to complex the particle to ions consists of functionalization with an ion sequester selected from the group consisting of diamines, porphyrins, triazole-containing molecules, proteins, peptides, polymers, nucleic acids, RNA, and DNA, including EDTA, EGTA, DTPA and BAPTA.

According to an embodiment of the first aspect, a moiety capable of specifically binding the one or more ions present in the water source is a chelating agent.

According to an embodiment of the first aspect, the particles are superparamagnetic and non-functionalized magnetite particles. pH of step (ii) can be adjusted and deviating from neutral i.e. deviating from pH=7.0. pH of step (ii) can be adjusted either to above 8 or to below 5.0.

According to an embodiment of the first aspect, the water source is an untreated water source e.g. selected from seawater, water from an estuary, or brackish water having a salinity above 0.05% (500 ppm).

According to an embodiment of the first aspect, the water source is sea water having a salinity above 2% (20 000 ppm) and below 4% (40 000 ppm), normally around 3.5% (35 000 ppm).

According to an embodiment of the first aspect, the water source is in any form of untreated or pre-treated water, e.g. treated by reverse osmosis, nano-filtration, vapour distillation, or freezing desalination.

According to an embodiment of the first aspect, the water source has a salinity of less than 250.000 ppm.

According to an embodiment of the first aspect, the water source in the capturing in step (ii) and/or the removing in step (iii) has a temperature in the range 4-60° C., preferably in the range of 4-40° C. and/or has a pressure in the range 1-200 atm.

According to an embodiment of the first aspect, the steps (i), (ii) and (iii) are a continuous process of providing water depleted in the particular ions.

According to an embodiment of the first aspect, the water has been depleted in at least one particular ion, such as at least two particular ions, e.g. at least three particular ions, such as at least four particular ions. The ion can be a cation or the ion can be an anion.

A further aspect of the invention is directed to a system for recovering crude oil from a hydrocarbon-reservoir comprising a water treatment plant, an injection well and an oil production well, wherein
the water treatment plant comprises at least two regions, a reaction region where superparamagnetic or paramagnetic particles will bind to ions and a holding region holding ready-to-bind superparamagnetic or paramagnetic particles, —the reaction region is connected to the holding region allowing addition of superparamagnetic or paramagnetic particles to the reaction region, the reaction region further has an inlet for untreated water, an outlet for treated water and is provided with means for mixing and means for applying a magnetic field, —the reaction tank outlet for treated water is connected with the one or more injection well(s) which injection well(s) are further connected to the one or more oil production well(s).

Each "region" may be constituted by a single tank provided with rigid walls of plastic or metal, or it may be constituted of a several tanks or tubes with rigid walls of metal or plastic. Each region can hold a liquid and allows for liquid being transferred to and from the region.

According to an embodiment of the further aspect, the reaction region is provided with rigid walls of non-metallic material such as plastic.

According to an embodiment of the further aspect, the water treatment plant comprises a third region in form of one or more storage compartments where the reaction tank outlet for treated water is connected to one or more storage compartments which storing compartments are then connected with the injection well(s).

According to an embodiment of the further aspect, the water treatment plant further comprises a separation region where superparamagnetic or paramagnetic particles are regenerated from the mixture of superparamagnetic or paramagnetic particles bonded to ions.

According to an embodiment of the further aspect, the one or more storage compartments of the third region is dimensioned to hold at least the amount to be used in the injection well(s) during the residence time of the reaction region. If residence time for a batch in the reaction region is 1 hour and the amount to be used in the injection well pr. 1 hour is 5000 $m^3$, then the storage compartment should be able to hold 5000 $m^3$.

According to an embodiment of the further aspect, the water treatment plant is placed onshore.

A third aspect of the invention is directed to use of water depleted in one or more ions for recovering oil by water flooding, wherein the depletion of one or more ions from water is performed by capturing the one or more ions from a water source by contacting the water source with superparamagnetic or paramagnetic particles capable of binding the one or more ions present in the water source providing a capturing mixture followed by removing the ions bound to the superparamagnetic or paramagnetic particles from the capturing mixture by applying a magnetic field providing a water reduced in one or more ions.

According to an embodiment of the third aspect, the superparamagnetic or paramagnetic particles are functionalized with a moiety capable of specifically binding the ions present in the water source.

BRIEF DESCRIPTION OF THE FIGURES

FIG. 2 depicts a practical application of the invention wherein a tank is filled with seawater containing ions. In a tank of non-magnetic and non-magnetisable material, such as plastic, magnetic particles conjugated with ion sequesters (IS) are present. IS may be any molecule with ion binding capability, such as EDTA, EGTA, DTPA, BAPTA and triazole-containing molecules, proteins, peptides, polymers, RNA or, DNA. The particles are of nanometer size (such as 1-300 nm) since small particles have a high area-to-volume ratio leading to a high conjugation capacity. The contents of the two tanks are mixed. A magnetic field is applied, separating the ion containing particles and the seawater depleted in ions is released through an outlet. The ions can be released from the IS and an additional round of ion depletion can take place.

DETAILED DESCRIPTION OF THE INVENTION

Figure 1:
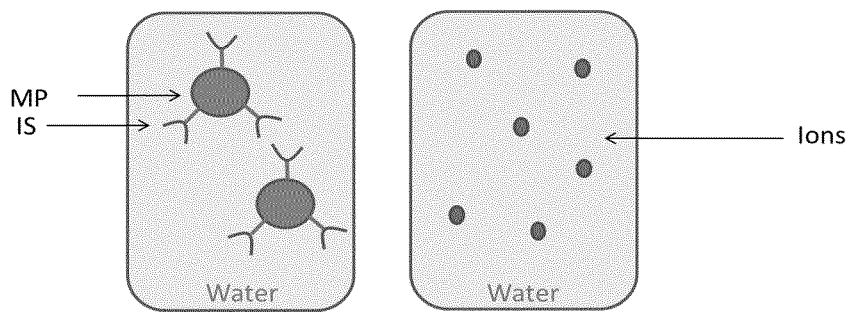
FIG. 1 depicts the concept of the magnetic depletion of ions using magnetic particles, wherein the particles conjugated to an ion sequester molecule (IS) are mixed with water in a water tank. The particles and ion-containing water are mixed, leading to the sequestering of the ions. A magnetic field is applied thereby attracting the particles and sequestered ions, allowing for their removal from the water phase.
Figure 1:
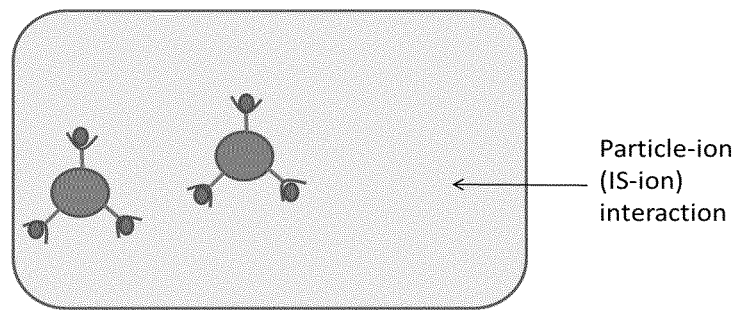
Figure 1:
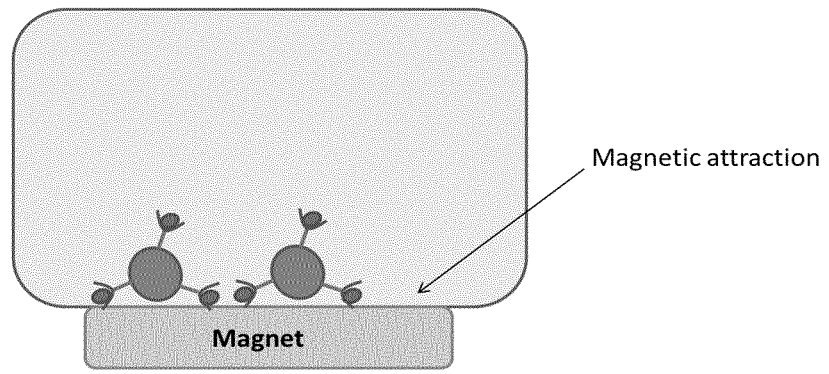

The invention is generally directed to a method of depleting the content of a selected ion or a combination of ions from a water source, such as for a water flooding process. The invention further relates to a method of treating an oil well, more specifically to a method for recovering crude oil from a hydrocarbon-bearing reservoir by water flooding, said methods using water depleted in ion content.

The method of the invention is applicable to water used in oil recovery, water used in natural gas recovery, the treatment of water wells, and for water used in hydraulic fluids for fracturing processes, such as water to be used in fracking fluids, water for water flooding or water used with low-salinity pulse treatment (LSP).

The method of the invention is furthermore applicable to the treatment of water which has been used for hydraulic fracturing to remove contaminants, such as stored water from unlined surface ponds.

One embodiment of the invention relates to a method for recovering crude oil from the ground by water flooding, the method comprises the steps of:
(i) Providing a water source;
(ii) Capturing one or more ions from the water source by contacting the water source with a superparamagnetic or paramagnetic particle capable of binding the one or more ions present in the water source providing a capturing mixture;
(iii) Removing the ions bound to the superparamagnetic or paramagnetic particles from the capturing mixture by applying a magnetic field providing a depleted water;
(iv) Pumping the depleted water into one or more connecting injection well in an oil field pushing the crude oil towards one or more production well(s);
(v) Recovering the crude oil from the one or more production well(s).

A central unifying aspect of the invention is directed to a method of depleting the ion content in a water source for a water flooding process, said method comprising the steps of
 a. Contacting the water source with a functionalized superparamagnetic or paramagnetic particle said functionalization adapted to complex the particle to ions;
 b. Complexing at least a portion of the ion content with the particle so as to form an ion-particle complex;
 c. Removing the ion-particle complex by applying a magnetic field so as to provide a water source with depleted ion content.

A further aspect of the invention is directed to a method of depleting the ion content in a water source to be used for wettability alteration of rock, said method comprising the steps a-c, wherein steps a-b as described and step c. consists of
 c. Removing the ion-particle complex by applying a magnetic field so as to provide a water source with depleted ion content to promote altered rock wettability.

An alternate aspect of the invention is a method of desalination of a water source for a water flooding process, said method comprising the steps a-c, wherein steps a-b as described and step c. consists of
 c. Removing the ion-particle complex by applying a magnetic field so as to provide an at least partially desalinated water source.

A further alternate aspect of the invention is directed to a method of depleting the ion content in a water source for promotion of emulsions consisting of oil and water, said method comprising the steps a-c, wherein steps a-b as described and step c consists of
 c. Removing the ion-particle complex by applying a magnetic field so as to provide a water source with depleted ion content to promote oil emulsification.

The present invention may furthermore be used as a pre-step for low-salinity pulse (LSP) treatment where low-salinity water is injected to bacteria containing environments leading to cell membrane explosion of bacteria due to osmotic pressure resulting in efficient killing of the bacteria. The pre-step of this is removal of dissolved salts from seawater which is to be used for LSP treatment to achieve low salinity by means of particles capable of sequestering dissolved salts. The particles can become magnetic when a magnetic field is applied and will subsequently be dragged out of the solution thus removing sequestered salt ions. The ions will subsequently be removed from the particles and the particles can hereafter be re-used for next-rounds of ion depletion.

In an important embodiment of the invention, molecules with high-affinity ion binding capabilities (ion sequesters, IS (Definition: combining of ions with a suitable reagent into a stable, soluble complex in order to prevent the ions from combining with a substance with which they would otherwise have formed an insoluble precipitate, from causing interference in a particular reaction, or from acting as undesirable catalysts)) are conjugated to a magnetisable (paramagnetic) particle (MP). The particles are superparamagnetic or paramagnetic and are typically nanometer in size since small particles have a high area-to-volume ratio, thereby leading to a high IS-conjugation capacity.

Accordingly, in a preferred embodiment, the superparamagnetic or paramagnetic particle is functionalized, said functionalization adapted to complex the particle to ions wherein said functionalization comprises molecules or a combination of molecules with high-affinity ion binding capabilities conjugated to the magnetisable particle (MP). The molecule with high-affinity ion binding capability is typically ion sequester (IS) or a combination of ion sequesters, such as an anion sequester and/or a cation sequester.

A magnetisable particle becomes magnetic when a magnetic field is present, and becomes non-magnetic when the field is removed. The particles are not permanently magnetic since such particles would aggregate and precipitate. When the functionalized particle is added, the molecule with high-affinity ion binding capability, anion sequester and/or a cation sequester, will bind to and sequester ions in solution. Due to the large area-to-volume ratio of the particles, the particles will have a large ion-sequestering/catching capacity. For illustrative purposes, the functionalized particles are added to seawater with the purpose to remove mono- and divalent ions, even more preferably to selectively remove certain mono- and divalent ions.

The functionalized particles and the sequestered ions may then subsequently be isolated from the water by applying a magnetic field that will magnetize those particles leading to migration of the particles to the magnet. The particles are then removed from the ion-depleted water, and the ions are subsequently released from the functionalized particles by elution based on e.g. pH, competitive ion exchange etc. For instance EDTA binding to ions is pH dependent. After release of the ion, the functionalized particles can hereafter be recovered, re-suspended and reused again.

The particles are paramagnetic in nature in that they are attracted to a magnet when placed in a magnetic field but retain no magnetic memory upon removal of the magnetic field. This characteristic prevents aggregation and allows for easy dispersion of the particles. Paramagnetic materials include most chemical elements and some compounds, they have a relative magnetic permeability greater or equal to 1 (i.e., a positive magnetic susceptibility) and hence are attracted to magnetic fields. The paramagnetism of the particle may be achieved by any number of elements or compounds. The particle may be superparamagnetic or paramagnetic due to the use of an organic superparamagnetic or paramagnetic compound, a metallic superparamagnetic or paramagnetic compound or an organometallic superparamagnetic or paramagnetic compound.

The superparamagnetism or paramagnetism of the particle may be due to the particles comprising an element selected from the group consisting of lithium, oxygen, sodium, magnesium, aluminum, calcium, titanium, manganese, iron, cobalt, nickel, strontium, zirconium, molybdenum, ruthenium, rhodium, palladium, tin, barium, cerium, neodymium, samarium, europium, gadolinium, terbium, dysprosium, holmium, erbium, thulium, osmium, tungsten, tungsten iridium, tungsten and platinum. Strong paramagnetism is exhibited by compounds containing iron, palladium, platinum, and the rare-earth elements. Accordingly, the particles preferably comprise an element selected from the group consisting of iron, palladium, platinum, and the rare-earth elements. The superparamagnetism or paramagnetism of the particle may be due to the particles comprising an organometallic compound.

Magnetite is ferrimagnetic, but magnetite nanoparticles are superparamagnetic at room temperature. This superparamagnetic behavior of iron oxide nanoparticles can be attributed to their size. When the size of a particle gets small enough (<20 nm), thermal fluctuations can change the direction of magnetization of the entire crystal. A material with many such crystals behaves like a paramagnet, except that the moments of entire crystals are fluctuating instead of individual atoms.

The particles may comprise a superparamagnetic or paramagnetic core, optionally coated with an inorganic or organic compound; or may comprise a composite core of a paramagnetic and a non-paramagnetic compound. The particle may be selected from the group consisting of a particle functionalized by conjugation with a binding molecule, a nanoparticle, or a nanoparticle conjugated with a binding molecule.

Polymers are suitable as non-paramagnetic components of super-paramagnetic or paramagnetic composite particles or composite cores of particles, which comprise a superparamagnetic or paramagnetic metallic or organometallic component and a non-paramagnetic polymeric component. Polymeric components may provide functionality useful for binding to an analyte or functionality which can be further derivatized for binding to an analyte. Examples of polymers for use in a composite particle or composite core of a particle include styrenic polymers or copolymers, (meth)acrylate polymers or copolymers, or a highly conjugated aromatic polymer.

The particles are superparamagnetic or paramagnetic particles and may bind the ions either by virtue of their small size or by means of a binding molecule, or a combination thereof. The particles may bind to the ions by virtue of their small size or due to complexation to the functionalization of the particle
- via a functionality present in metallic or organometallic core;
- via further functionalization of the functionality present in metallic or organometallic core
- via a functionality present in a polymer used in the preparation of the particle core;
- via further functionalization of a polymer used in the preparation of the particle core,
- via a coating which comprises a functionality; or
- via functionalization of a coating for adjusting surface properties for binding to ions as well as for blendability of the particles.

In a typical embodiment, the functionalization adapted to complex the particle to ions consists of a linked ion sequester or chelating agent. The functionalization adapted to complex the particle to ions may consist of functionalization with an ion sequester selected from the group consisting of diamines, porphyrins, triazole-containing molecules, proteins, peptides, polymers, nucleic acids, RNA, and DNA, including EDTA, EGTA, DTPA and BAPTA.

The superparamagnetic or paramagnetic particle may bind the ions present in the water source by non-specific binding or by specific binding. Accordingly, the superparamagnetic or paramagnetic particle is capable of binding the ions present in the water source by non-specific binding or by specific binding. The superparamagnetic or paramagnetic particles may be functionalized with a moiety capable of non-specifically binding the ions present in the water source. Alternatively, the superparamagnetic or paramagnetic particles are functionalized with a moiety capable of specifically binding selected ions or class of ions present in the water source.

The moiety capable of specifically binding the one or more ions present in the water source can be a chelating agent in that one type or class of ions is targeted over another. For instance, cations may be specifically selected over anion. Alternatively, sodium, calcium, magnesium, copper and/or cobalt may be specifically selected alone or in combination. Similarly, phosphates, nitrates, sulphates and/or chlorides may be specifically selected alone or in combination.

Molecules with high-affinity ion binding capabilities may be molecules with anion recognition, cation recognition, or both, and may be molecules capable of ion pairing, H-bonding and/or ion-pi bonding, since these interactions are often seen for biomolecule-ion interactions. For instance DNA, RNA, proteins, peptides and lipids are known to bind to ions of different charge and valence. The molecules with high-affinity ion binding capabilities may comprise molecules selected from the group consisting of EDTA (Ethylenediaminetetraacetic acid), EGTA (ethylene glycol tetraacetic acid), DTPA (diethylene triamine pentaacetic acid) and BAPTA (1,2-bis(o-aminophenoxy)ethane-N,N,N',N'-tetraacetic acid) or derivative thereof. These molecules, or derivative thereof, function as ion sequesters due to their ion-chelating properties. The examples listed here are suitable embodiments of ion sequesters and are all metal ion sequesters. Other molecules with high-affinity ion binding capabilities are molecules capable of sequestering anions, such as chloride ions that can be bound to e.g. triazole motifs of anion scavenger molecules.

In one embodiment, the superparamagnetic or paramagnetic particle is a nanoparticle without any conjugated molecule with high-affinity ion binding capability where ion adsorption or complexation to the particle would occur solely due to inherent functionalization of the nanoparticle with surface energy as driving force. For very small nanoparticles surface energy will be large due to the high area-to-volume ratio and due to quantum confinement effects (i.e. the size is less than the wavelength of electrons (de Broglie wavelength) leading to the bypassing of periodic quantum mechanical boundary conditions). Surface energy and driving forces can be tuned, for instance by the size or the selection of the polymer material.

One embodiment of the invention would be to use non-functionalized $Fe_3O_4$ particles added directly to the water source followed by addition of
1) a base (e.g. NaOH) to obtain a pH in the range of 8+/- to add negative charge on the magnetite nanoparticle ($FeO^-$)→cation adsorption
2) an acid (e.g. HCl) to obtain a pH in the range of 4+/- to add positive charge on the magnetite nanoparticle ($FeOH_2^+$)→anion adsorption.

In a further embodiment for specific ion depletion, functionalization of superparamagnetic particles may be done with highly charged molecules, including polysaccharides such as alginate and chitosan (both negatively charged) used for depletion of cations. Polyethyleneamines can be used for depletion of anions.

Generally, the superparamagnetic or paramagnetic particle may be at least partially functionalized with an organic molecule, and the size of the functionalized superparamagnetic or paramagnetic particles may be larger than the non-functionalized particles. Accordingly, the diameter of superparamagnetic or paramagnetic particles may be between 1 nm-10 μm, depending on whether they are non-functionalized or at least partially functionalized with an organic molecule.

Superparamagnetic or paramagnetic particles may be of a size of less than 150 nm in diameter since particles of this diameter have a high area-to-volume ratio leading to a high conjugation capacity. Suitably, the particles may be dextran-based spherical beads.

In a further suitable embodiment, the particle has a diameter of less than 25 nm, such as less than 20 nm, and is made of iron or iron oxide ($Fe_3O_4$, magnetite). These particles have the advantage of very low sedimentation rates and do not plug micrometer scale pores.

Depending on the prevalence of the ions in the water (the concentration of ions in the water source) and the size and functionalization of the particle, the amount of particle used will vary. The weight of superparamagnetic or paramagnetic particle capable of binding the ions present in the water source typically will typically not exceed 0.5 kg per 1.000 kg water (i.e. 0.05 wt %) independent of the size of the particle, typically 500 kg water/cm$^2$ particles independent of the size of the particle, such as at least 750 kg water/cm$^2$ particles independent of the size of the particle, e.g. at least 1.000 kg water/cm$^2$ particles independent of the size of the particle, such as at least 2.500 kg water/cm$^2$ particles independent of the size of the particle, e.g. at least 5.000 kg water/cm$^2$ particles independent of the size of the particle, such as at least 7.500 kg water/cm$^2$ particles independent of the size of the particle, e.g. at least 10.000 kg water/cm$^2$ particles independent of the size of the particle, such as at least 15.000 kg water/cm$^2$ particles independent of the size of the particle.

The superparamagnetic or paramagnetic particles, prior to being conjugated with a molecule with high-affinity ion binding capability, may furthermore comprise or at least partially comprise a coating of an organic compound or an inorganic compound.

Wherein the superparamagnetic or paramagnetic particles may be at least partially coated with an organic compound, the organic compound may be typically selected from a polymer or copolymer comprising a polysaccharide, an alginate, a chitosan, a PEG, a dextran or a polyethyleneamine.

The superparamagnetic or paramagnetic particles may comprise a functional group, either from the particle or from a coating, such as for conjugation with a molecule with high-affinity ion binding capability. Such functional group can be selected from the group consisting of carboxy (e.g. carboxylic acid groups), epoxy, ether, ketone, amine, hydroxy, alkoxy, alkyl, aryl, aralkyl, alkaryl, lactone, ionic groups such as ammonium groups and/or carboxylate salt groups, polymeric or oligomeric groups or a combination comprising at least two of the forgoing functional groups.

Polymers used for functionalization of the particle may be selected from the group consisting of an antibody, a peptide of 2-200 amino acids, an amino acid, a polysaccharide, a sugar, a nucleotide or nucleoside including DNA or RNA, a $C_1$-$C_{30}$ alkyl, a $C_1$-$C_{30}$ alkenyl, a $C_1$-$C_{30}$ alkylyl, a $C_1$-$C_{30}$ ether, a $C_1$-$C_{30}$ amine, a $C_1$-$C_{30}$ ester, a $C_1$-$C_{30}$ amide, and combinations and co-polymers thereof. Polymers used for functionalization of the particle may be a polymer or copolymer comprising a polysaccharide, an alginate, a chitosan, a PEG, a dextran or a polyethyleneamine.

As stated, the composition of the superparamagnetic or paramagnetic particle may be further derivatized by grafting certain polymer chains to the functional groups. For example, polymer chains such as acrylic chains having carboxylic acid functional groups, hydroxy functional groups, and/or amine functional groups; polyamines such as polyethyleneamine or polyethyleneimine; poly(alkylene glycols) such as poly(ethylene glycol) and poly(propylene glycol), and polysaccharide chains may be grafted onto the superparamagnetic or paramagnetic particle by reaction with functional groups found on the particle.

In a particular interesting embodiment, the superparamagnetic or paramagnetic particles may be prepared by coating a layer of magnetite and polystyrene onto monodispersed (i.e. uniform sized) polystyrene core particles. The magnetite content of these magnetic particles can be adjusted but typically represents about 10% to 15% for 1 micron particles. The magnetic particles can be easily separated from a suspension magnetically. These particles become non-magnetic when removed from a magnet, and do not retain any detectable magnetism even after repeated exposure to strong magnetic field.

Examples of dextran-based spherical beads include Kisker-biotech® dextran-based nanoparticles in the size range of 20-100 nm); nanomag®-D, made of dextran polymers of size 130 nm; and MagCellect® particles of size 150 nm.

Superparamagnetic particles of other types of polymers or inorganic material may be used as well, such as silica. One particular advantage of using such small particles is that the size, physical properties, chemical reactivity and conjugation possibilities is flexible and can be tailor-made.

Suitably, the particles comprise a superparamagnetic or paramagnetic core, such as a magnetite core. The magnetite core may optionally be coated, or at least partially coated in silica or a silicate, or a ($SiO_2$)-magnetite ($Fe_3O_4$) composite. As an example, the superparamagnetic or paramagnetic particle, such as a nanoparticle or microparticle, may be coated or partially coated with tetraethyl ortho silicate, $Si(OC_2H_5)_4$ or TEOS. In the embodiment wherein the superparamagnetic or paramagnetic particles are at least partially coated with an inorganic compound, the inorganic compound may suitably be selected from silica, including derivatized silica.

Typically, the particles are superparamagnetic particles of size in the range of 1-1000 nm, such as in the range of 1-600 nm. Preferably, the diameter of superparamagnetic or paramagnetic particles are in the range of 1-500 nm, such as in the range of 1-300 nm, preferably in the range of 5-300 nm, such as in the range of 5-200 nm, typically 5-150 nm.

The functionalization with an ion sequester could be by functionalization of the particles with any molecule with ion binding capability, such as EDTA, EGTA, DTPA, BAPTA and triazole-containing molecules, proteins, peptides, polymers, RNA and DNA.

As stated, the particle may be functionalized with an inorganic compound, which may then optionally be modified with an organic compound for further conjugation with a molecule with high-affinity ion binding capability. The inorganic compound, such as silica, may be optionally modified with an organic compound, such as an organic compound selected from the group consisting of a protein, including an antibody, a peptide of 2-200 amino acids, an amino acid, a polysaccharide, a sugar, a nucleotide or nucleoside including DNA or RNA, a $C_1$-$C_{30}$ alkanyl, a $C_1$-$C_{30}$ alkenyl, a $C_1$-$C_{30}$ alkylyl, a $C_1$-$C_{30}$ ether, a $C_1$-$C_{30}$ amine, a $C_1$-$C_{30}$ ester, a $C_1$-$C_{30}$ amide, and combinations thereof.

In a suitable embodiment, the particle is functionalized with an inorganic compound in the form of tetraethyl ortho silicate, $Si(OC_2H_5)_4$ or TEOS.

In another suitable embodiment, the particles have a superparamagnetic or paramagnetic core constituted of iron or iron oxide particles with an average diameter of less than 50 nm, such as less than 20 nm, such as less than 10 nm, which core particle may be at least partially coated with polyethylene glycol or a co-polymer comprising polyethylene glycol.

In yet another embodiment, the superparamagnetic or paramagnetic particle is a superparamagnetic iron oxide particle, optionally coated, or at least partially coated, with silica. The silica coat encapsulates the superparamagnetic iron oxide particles and makes the particles become very hydrophilic. Typically, the size of such coated or partially coated iron oxide particles is in the range of 5 to 50 nm, typically 5 to 20 nm. Such nanoparticles can be easily synthesized or bought commercially.

The silica coated or partially silica coated iron oxide particles may optionally further comprise a polymer or co-polymer coating to serve for further functionalization for conjugation with a molecule with high-affinity ion binding capability. The polymer or co-polymer coating may be added in selected proportions so as to tune the binding properties of the at least partially silica coated particle. In a typically embodiment, PEG may be used to coat the at least partially silica coated particle.

As stated, an aspect of the invention relates to a method of treating an oil well, the method comprising the steps of
 (i) Providing a water source;
 (ii) Capturing analytes from the water source by contacting the water source with a superparamagnetic or paramagnetic particle capable of binding to ions present in the water source providing a capturing mixture;
 (iii) Removing the ion bound to the superparamagnetic or paramagnetic particles from the capturing mixture by applying a magnetic field providing a depleted water;
 (iv) Pumping the depleted water into one or more connecting injection well(s) in an oil field pushing the crude oil towards one or more production well(s);
 (v) Recovering the crude oil from the one or more production well(s).

The method of the invention provides for
 1) Low-salinity flooding for enhanced oil recovery, either caused by wettability alteration or by stabilizing emulsions;
 2) Inhibition of bacterial growth in pipelines. Many bacteria lyse (bursting of cell wall) when shock-treated with fresh water because the salinity difference between the inside of the cell and its surroundings gives rise to sudden changes in osmotic pressure; and
 3) A method for use in desalination plants, providing an advantage in terms of logistics since the desalination plant is onshore In a typical embodiment, the invention is practiced in the following manner:
 1. Seawater enters a metallic tube (conventional)
 2. Seawater enters a non-metallic and non-magnetisable, such as plastic tank or a tube-region made of non-metallic material, such as plastic, where IS-MPs are present. Time is allowed for mixing and equilibration
 3. A magnetic field is applied on the plastic tank—and the particles are pulled towards the magnet (NOTE: The magnetic field will be unaffected by plastic)
 4. The seawater is sent to down-stream tubes and ready for injection
 5. The trapped particles are removed (with sequestered ions) to another compartment.
  i: Ions are eluted with e.g. pH (e.g. for the special 'non-functionalized' case mentioned above), thermal energy, competitive ion exchange etc.
  ii: IS-MP particles are resuspended after elution and removal of external magnetic field and can now be re-used.

The water source to be the subject of the depletion of ions by the method of the invention may be selected from seawater, and water from an estuary, brackish water, water having a salinity above 0.05% (above 500 ppm), and untreated water sources. Typically the water source is sea water normally having a salinity above 1% (10.000 ppm), i.e. between 1-5% (10.000-50.000 ppm), normally between 2-4%, but the water source may be any untreated water source available in the proximity of use.

The water source may suitably be an untreated water source readily available in large amounts or may alternatively be a pre-treated water source, e.g. treated by reverse osmosis, nano-filtration, vapour distillation, or freezing desalination.

According to one aspect the invention might relate to a method for recovering crude oil from a hydrocarbon-bearing reservoir by water flooding, the method comprises the steps of:
 (vi) Providing a water source;
 (vii) Capturing one or more ions from the water source by contacting the water source with a superparamagnetic or paramagnetic particle capable of binding the one or more ions present in the water source providing a capturing mixture;
 (viii) Removing the ions bound to the superparamagnetic or paramagnetic particles from the capturing mixture by applying a magnetic field providing a depleted water;
 (ix) Pumping the depleted water into one or more connecting injection well(s) in an oil field pushing the crude oil towards one or more production well(s);
 (x) Recovering the crude oil from the one or more production well(s).

According to a second aspect the invention might relate to a method of depleting the ion content in a water source for a water flooding process, said method comprising the steps of
 a. Contacting the water source with a functionalized superparamagnetic or paramagnetic particle said functionalization adapted to complex the particle to ions;
 b. Complexing at least a portion of the ion content with the particle so as to form an ion-particle complex;
 c. Removing the ion-particle complex by applying a magnetic field so as to provide a water source with depleted ion content.

According to a third aspect the invention might relate to a method of depleting the ion content in a water source to be used for wettability alteration of rock, said method comprising the steps of
 a. Contacting the water source with a functionalized superparamagnetic or paramagnetic particle said functionalization adapted to complex the particle to ions;
 b. Complexing at least a portion of the ion content with the particle so as to form an ion-particle complex;
 c. Removing the ion-particle complex by applying a magnetic field so as to provide a water source with depleted ion content to promote altered rock wettability.

According to a fourth aspect the invention might relate to a method of desalination of a water source for a water flooding process, said method comprising the steps of a. Contacting the water source with a functionalized superparamagnetic or paramagnetic particle said functionalization adapted to complex the particle to ions;
b. Complexing at least a portion of the ion content with the particle so as to form an ion-particle complex;
c. Removing the ion-particle complex by applying a magnetic field so as to provide an at least partially desalinated water source.

According to a fifth aspect the invention might relate to a method of depleting the ion content in a water source for promotion of emulsions consisting of oil and water, said method comprising the steps of
a. Contacting the water source with a functionalized superparamagnetic or paramagnetic particle said functionalization adapted to complex the particle to ions;
b. Complexing at least a portion of the ion content with the particle so as to form an ion-particle complex;
c. Removing the ion-particle complex by applying a magnetic field so as to provide a water source with depleted ion content to promote oil emulsification.

According to an embodiment of any of the above aspects, the diameter of superparamagnetic or paramagnetic particles are between 1 nm to 10 µm, preferably the superparamagnetic or paramagnetic particles are superparamagnetic nano-particles of size in the range of 1 to 1000 nm.

According to an embodiment of any of the above aspects, the particle size of the nano-particles is in the range of 1 to 600 nm, such as in the range of 3 to 500 nm, e.g. in the range of 5 to 300 nm, e.g. in the range of 7.5 to 200 nm, such as in the range of 10 to 100 nm, e.g. in the range of 15 to 50 nm.

According to an embodiment of any of the above aspects, the weight of superparamagnetic or paramagnetic particle capable of binding the one or more ions present in the water source does not exceed 0.5 kg per 1.000 kg water (i.e. 0.5 wt %) independent of the size of the particle.

According to an embodiment of any of the above aspects, the weight of superparamagnetic or paramagnetic particle capable of binding the one or more ions present in the water source is at least 250 kg water/$cm^2$ particles. This amount corresponds to a weight percent of particles of 0.000000004 wt % for particles having a radiaus of 50 µm.

According to an embodiment of any of the above aspects, the superparamagnetic or paramagnetic particle is capable of binding the one or more ions present in the water source by non-specific binding or by specific binding.

According to an embodiment of any of the above aspects, the superparamagnetic or paramagnetic particles are coated with an organic compound or an inorganic compound.

According to an embodiment of any of the above aspects, the superparamagnetic or paramagnetic particles are coated with a polymer, such as a polysaccharide, an alginate, a chitosan, a PEG, a dextran or a polyethyleneamine.

According to an embodiment of any of the above aspects, the superparamagnetic or paramagnetic particles are functionalized with a moiety capable of specifically binding the one or more ions present in the water source.

According to an embodiment of any of the above aspects, the functionalization adapted to complex the particle to ions consists of a linked ion sequester or chelating agent.

According to an embodiment of any of the above aspects, the functionalization adapted to complex the particle to ions consists of functionalization with an ion sequester selected from the group consisting of diamines, porphyrins, triazole-containing molecules, proteins, peptides, polymers, nucleic acids, RNA, and DNA, including EDTA, EGTA, DTPA and BAPTA.

According to an embodiment of any of the above aspects, a moiety capable of specifically binding the one or more ions present in the water source is a chelating agent.

According to an embodiment of any of the above aspects, the water source is selected from seawater, and water from an estuary, brackish water, water having a salinity above 0.05% (above 15 ppt), and untreated water sources.

According to an embodiment of any of the above aspects, the water source is sea water.

According to an embodiment of any of the above aspects, the water source is in any form of untreated or pre-treated water, e.g. treated by reverse osmosis, nano-filtration, vapour distillation, or freezing desalination.

According to an embodiment of any of the above aspects, the water source has a salinity of less than 250.000 ppm.

According to an embodiment of any of the first aspects, the water source in the capturing in step (ii) and/or the removing in step (iii) has a temperature in the range 4-60° C., preferably in the range of 4-40° C. and/or has a pressure in the range 1-200 atm.

According to an embodiment of any of the first aspects, the steps (i), (ii) and (iii) are a continuous process of providing water depleted in the particular ions.

According to an embodiment of any of the above aspects, the water has been depleted in at least one particular ion, such as at least two particular ions, e.g. at least three particular ions, such as at least four particular ions. The ion can be a cation or an anion.

According to an embodiment of any of the above aspects, the water source and the superparamagnetic or paramagnetic particles are contacted in a first water tank.

According to an embodiment of any of the above aspects, the first water tank is made of a non-magnetisable or non-magnetic material such as plastic.

According to an embodiment of any of the above aspects, the depleted water is stored in a second water tank.

According to an embodiment of any of the above aspects, the second water tank has a volume of at least 1 $m^3$.

According to a sixth aspect the invention might relate to a system comprising an oil production plant connected to at least one production well and a water purification plant connected to at least one injection well, wherein the water purification plant comprises at least one inlet, at least one capturing site, at least one analyte removing site and at least one outlet, said at least one capturing site comprises superparamagnetic or paramagnetic particles capable of binding one or more ions present in the water source and wherein the at least one removing site comprises a non-magnetisable material and means for applying a magnetic field wherein the outlet from the water purification plant is connected to the at least one injection well.

According to an embodiment of the sixth aspect, the diameter of superparamagnetic or paramagnetic particles are between 1 nm to 10 µm, preferably the superparamagnetic or paramagnetic particles are superparamagnetic nanoparticles of size in the range of 1 to 1000 nm.

According to an embodiment of the sixth aspect, the particle size of the nano particles is in the range of 1 to 600 nm, such as in the range of 3 to 500 nm, e.g. in the range of 5 to 300 nm, e.g. in the range of 7.5 to 200 nm, such as in the range of 10 to 100 nm, e.g. in the range of 15 to 50 nm.

According to an embodiment of the sixth aspect, the superparamagnetic or paramagnetic particles are coated with an organic compound or an inorganic compound.

According to an embodiment of the sixth aspect, the superparamagnetic or paramagnetic particles are coated with a polymer, such as a polysaccharide, an alginate, a chitosan, a PEG, a dextran or a polyethyleneamine.

According to an embodiment of the sixth aspect, the superparamagnetic or paramagnetic particles are functionalized with a moiety capable of specifically binding one or more ions present in the water source.

According to an embodiment of the sixth aspect, the water source and the superparamagnetic or paramagnetic particles are contacted in a first water tank.

According to a seventh aspect the invention might relate to use of water depleted in one or more ions for recovering oil by water flooding, wherein the depletion of one or more ions from water is performed by capturing the one or more ions from a water source by contacting the water source with superparamagnetic or paramagnetic particles capable of binding the one or more ions present in the water source providing a capturing mixture followed by removing the ions bound to the superparamagnetic or paramagnetic particles from the capturing mixture by applying a magnetic field providing a water reduced in one or more ions.

According to an embodiment of the seventh aspect, the superparamagnetic or paramagnetic particles are functionalized with a moiety capable of specifically binding the ions present in the water source.

The invention claimed is:

1. A method for recovering crude oil from a hydrocarbon-bearing reservoir by water flooding, the method comprises the steps of:
   (i) providing a water source;
   (ii) depleting one or more ions from the water source by contacting the water source with a superparamagnetic or paramagnetic particle capable of binding the one or more ions present in the water source thereby providing a capturing mixture;
   (iii) removing the ions bound to the superparamagnetic or paramagnetic particles from the capturing mixture by applying a magnetic field thereby providing a depleted water;
   (iv) pumping the depleted water into one or more connecting injection well(s) in an oil field thereby pushing the crude oil towards one or more production well(s); and
   (v) recovering the crude oil from the one or more production well(s),
   wherein the superparamagnetic or paramagnetic particles are functionalized with a moiety capable of specifically binding the one or more ions present in the water source; and
   wherein the functionalization adapted to specifically bind the superparamagnetic or paramagnetic particles to the one or more ions consists of functionalization with an ion sequester selected from the group consisting of diamines, porphyrins, triazole-containing molecules, nucleic acids, RNA, DNA, EDTA, EGTA, DTPA and BAPTA.

2. The method according to claim 1, wherein the superparamagnetic or paramagnetic particles are at least partially coated with silica or derivatized silica.

3. The method according to claim 1, wherein pH of step (ii) is adjusted and deviates from neutral.

4. The method according to claim 3, wherein pH of step (ii) is adjusted either to above 8 or to below 5.0.

5. The method according to claim 1, wherein the water source is an untreated water source having a salinity above 0.05% (500 ppm).

6. The method according to claim 1, wherein the water source is sea water having a salinity above 2% (20000 ppm) and below 4% (40000 ppm).

7. The method according to claim 1, wherein the water source is in any form of untreated or pre-treated water.

8. The method according to claim 1, wherein the water source has a salinity of less than 250,000 ppm.

9. The method according to claim 1, wherein the water source in the depletion in step (ii) and/or the removing in step (iii) has a temperature in the range 4-60° C. and/or has a pressure in the range 1-200 atm.

10. The method according to claim 1, wherein steps (i), (ii) and (iii) are a continuous process of providing water depleted of said ions.

11. The method according to claim 1, wherein the ion is a cation.

12. The method according to claim 1, wherein the ion is an anion.

13. The method according to claim 1, wherein the water source is an untreated water source selected from seawater, water from an estuary, or brackish water having a salinity above 0.05% (500 ppm).

14. The method according to claim 1, wherein the water source is sea water having a salinity around 3.5% (35000 ppm).

15. The method according to claim 1, wherein the water source is in any form of water pre-treated by reverse osmosis, nano-filtration, vapour distillation, or freezing desalination.

16. The method according to claim 1, wherein the water source in the depletion in step (ii) and/or the removing in step (iii) has a temperature in the range 4-40° C., and/or has a pressure in the range 1-200 atm.

17. The method according to claim 1, wherein the water has been depleted in at least two particular ions or at least three particular ions or as at least four particular ions.

18. A system for recovering crude oil from a hydrocarbon-reservoir comprising a water treatment plant, an injection well and an oil production well, wherein
   the water treatment plant comprises at least two regions, a reaction region where superparamagnetic or paramagnetic particles will bind to ions and a holding region holding ready-to-bind superparamagnetic or paramagnetic particles, wherein the superparamagnetic or paramagnetic particles are functionalized with an ion sequester selected from the group consisting of diamines, porphyrins, triazole-containing molecules, nucleic acids, RNA, DNA, EDTA, EGTA, DTPA and BAPT to facilitate binding with the ions,
   the reaction region is connected to the holding region allowing addition of superparamagnetic or paramagnetic particles to the reaction region, the reaction region further has an inlet for untreated water, an outlet for treated water and is provided with means for mixing and means for applying a magnetic field, and
   the reaction tank outlet for treated water is connected with the one or more injection well(s) which injection well(s) are further connected to the one or more oil production well(s).

19. The system according to claim 18, wherein the reaction region is provided with rigid walls of non-metallic material.

20. The system according to claim 18, wherein the water treatment plant comprises a third region in form of one or more storage compartments where the reaction tank outlet for treated water is connected to one or more storage compartments which storing compartments are then connected with the injection well(s).

21. The system according to claim 20, wherein the one or more storage compartments of the third region is dimensioned to hold at least the amount to be used in the injection well(s) during the residence time of the reaction region.

22. The system according to claim 18, wherein the water treatment plant further comprises a separation region where superparamagnetic or paramagnetic particles are regenerated from a mixture of superparamagnetic or paramagnetic particles bonded to ions.

23. The system according to claim 18, wherein the water treatment plant is placed onshore.

24. The system according to claim 18, wherein the reaction region is provided with rigid walls of plastic.

25. A method for using water to recover oil by water flooding, comprising:
   providing water that is depleted of one or more ions, wherein the depletion of the one or more ions from water has been performed by capturing the one or more ions from a water source by contacting the water source with superparamagnetic or paramagnetic particles capable of binding the one or more ions present in the water source providing a capturing mixture followed by removing the ions bound to the superparamagnetic or paramagnetic particles from the capturing mixture by applying a magnetic field providing a water reduced in one or more ions, wherein the superparamagnetic or paramagnetic particles have been functionalized with a moiety capable of specifically binding the ions present in the water source and wherein the functionalization adapted to specifically bind the superparamagnetic or paramagnetic particles to the one or more ions consists of functionalization with an ion sequester selected from the group consisting of diamines, porphyrins, triazole-containing molecules, nucleic acids, RNA, DNA, EDTA, EGTA, DTPA and BAPTA; and
   injecting the water that is depleted of one or more ions into an injection well.

* * * * *